United States Patent [19]

Takeuchi

[11] Patent Number: 4,924,990
[45] Date of Patent: May 15, 1990

[54] DAMPER DISC

[75] Inventor: Hiroshi Takeuchi, Higashiosaka, Japan

[73] Assignee: Kabushiki Kaisha Daikin Seisakusho, Osaka, Japan

[21] Appl. No.: 243,557

[22] PCT Filed: Nov. 30, 1987

[86] PCT No.: PCT/JP87/00930

§ 371 Date: Jul. 27, 1988

§ 102(e) Date: Jul. 27, 1988

[87] PCT Pub. No.: WO88/04373

PCT Pub. Date: Jun. 16, 1988

[30] Foreign Application Priority Data

Dec. 10, 1986 [JP] Japan .................. 61-294306

[51] Int. Cl.$^5$ .............................................. F16D 3/14
[52] U.S. Cl. ............................. 192/106.2; 192/106.1; 192/70.17; 464/68
[58] Field of Search ............. 192/70.17, 106.1, 106.2; 464/68

[56] References Cited

U.S. PATENT DOCUMENTS

| 4,396,103 | 8/1983 | Loizeau | 192/106.2 |
| 4,526,260 | 7/1985 | Schierling | 192/103 R |
| 4,533,031 | 8/1985 | Nagano | 192/70.17 |
| 4,537,297 | 8/1985 | Davies | 192/103 R |
| 4,545,473 | 10/1985 | Alas | 192/70.17 |
| 4,563,165 | 1/1986 | Takeuchi | 192/106.2 |
| 4,614,261 | 9/1986 | Takeuchi | 192/106.2 |
| 4,643,287 | 2/1987 | Lech, Jr. | 192/106.2 |

FOREIGN PATENT DOCUMENTS 57-134019  8/1982  Japan .
58-58120   4/1983  Japan .
58-67123   5/1983  Japan .

Primary Examiner—Rodney H. Bonck
Assistant Examiner—ANdrea Pitts
Attorney, Agent, or Firm—Armstrong, Nikaido, Marmelstein, Kubovcik & Murray

[57] ABSTRACT

A damper disc having a hub flange divided into a peripheral side flange divided into an inner peripheral side flange having a hub and an outer peripheral side flange which are meshed with each other with a circumferential clearance therebetween. Annular sub plates, holding both side flanges, are installed on opposite sides of the flanges. A relatively weak torsion spring is interposed in a recession and a rectangular hole is provided at a positon where the sub plates face on the inner peripheral side flange. Inner peripheral parts of the sub plates are pressed on opposite side faces of the inner peripheral side flange. A retaining plate and a clutch plate are provided on outside faces of the sub plates opposite to a flange through a friction material having a relatively high friction coefficient. An intermediate member and a second friction material having a relatively low coefficient, the retaining plate and the clutch plate are coupled by a stop pin at an outer peripheral part so as to compress both the friction materials. The intermedate member has claws fitted in holes in the retaining plate and the clutch plate in such manner that the claws can move freely in a circumferential direction within a specified torsion angle. Relatively strong torsion springs are compressively installed in rectangles holes in the retaining plate, the clutch plate and the outer peripheral side flange at a position where the retaining plate and the clutch plate face the outer peripheral side flange. A key piercing the outer peripheral side flange, the inner peripheral side flange and both sub plates, in an approximately center line direction is positioned so as to be urged toward an outer periphery of the damper disc. Notches on the inner peripheral side flange and the sub plates hold the key freely slidingly in a radial direction of the disc. A force for holding the key at circumferential end faces of both notches sets and holds the key between both sides end faces for relatively high torsion angular velocity of the damper disc and for releasing the key from the end faces for relatively low torsion angular velocity of the damper disc.

2 Claims, 6 Drawing Sheets

DAMPER DISC

TECHNICAL FIELD

This invention relates to a damper disc for preventing three kinds of vibrations generated in a vehicle, such as an idle rattle, a driving rattle and a low frequency abnormal vibration (tip-in & tip-out).

BACKGROUND ART

When a damper disc is used for an automobile clutch disc, it is preferable to prevent three kinds of vibrations such as the idle rattle, the driving rattle and the low frequency abnormal vibration (tip-in and tip-out). In a conventional clutch disc, however, it has been difficult to prevent these three kinds of vibrations simultaneously.

For example, the applicant of the present invention has conventionally developed a clutch disc (Japanese Published Patent Application No. 61-40847), in which a disc-like hub flange of a spline hub has been divided into an inner peripheral part and an outer peripheral part, a weak torsion spring has been installed in the inner peripheral part, strong torsion springs have been installed in the outer peripheral part, so that the weak spring is made to function for a small torsion angle range and the strong springs are made to function for a large torsion angle range. However, this prior art has been effective for the idle rattle and the driving rattle but ineffective for the low frequency abnormal vibration. Further, in a clutch disc (Japanese Patent Application No. 60-44300, Patent Publication No. 61-201933) wherein a first friction material provided with a high friction coefficient and a second friction material provided with a low friction coefficient have been installed to increase or decrease a hysteresis torque according to a torsion angle, it has been possible to prevent the driving rattle and the low frequency abnormal vibration but impossible to prevent the idle rattle.

Moreover, the applicant of the present invention has also developed a disc clutch (Japanese Patent Application No. 58-82319, Patent Publication No. 59-208226) wherein a key has been installed between an inner peripheral side flange and an outer peripheral side flange of said Published Patent Application No. 61-40847 so that the key can be freely connected or disconnected according to a torsion angle. However, a technical measure to utilize this disconnectable key for preventing the three kinds of vibrations has not been disclosed in this prior art.

An object of this invention is to provide a damper disc which can exert a low torsional rigidity in a small torsion angle and a large torsional rigidity in a large torsion angle, has a small hysteresis torque characteristic within a working range of fine angle and a large hysteresis torque characteristic within a working range of large angle, and can exert a large hysteresis torque characteristic for a high torsional angular velocity even within a fine working angle.

DISCLOSURE OF THE INVENTION

In a damper disc according to the present invention; a hub flange of a spline hub is divided into an inner peripheral side flange provided with hub and an outer peripheral side flange which are meshed with each other with a circumferential clearance left therebetween. Annular sub plates holding the flanges are installed on opposite sides of the flanges. A weak torsion spring is interposed in a rectangular hole provided at a position where the sub plates face on the inner peripheral side flange, inner peripheral parts of the sub plates are pressed on opposite side faces of the inner peripheral side flange. A retaining plate and a clutch plate are provided on outside faces of the sub plates opposite to the flange through a first friction material having a high friction coefficient, an intermediate member and a second friction material having a low friction coefficient. In turn, the retaining plate and the clutch plate are coupled by a stop pin at an outer peripheral part so as to compress both friction materials. Claws of the intermediate material fit into holes of the retaining plate and the clutch plate in such a manner that the claws can move freely in a circumferential direction within a specified torsion angle. Strong torsion springs are compressively installed in rectangular holes provided at a position where the retaining plate and the clutch plate face on the outer peripheral side flange. A key piercing the outer peripheral side flange and the inner peripheral side flange and the sub plates in an approximately center line direction of the disc is installed so as to be urged toward an outer periphery of the disc. Notches holding the key freely slidingly in a radial direction of the disc are provided on the inner peripheral side flange and the sub plate. A force for holding the key, produced at circumferential end faces of both notches, is so set that the key is kept held between the end faces for a high torsion angular velocity of the disc. The key is released from the end faces for a low torsion angular velocity thereof.

According to the above-identified structure, the weak torsion spring of the inner peripheral side flange exerts a low torsional rigidity in a small torsion angle and the strong torsion springs of the outer peripheral side flange exert a high torsional rigidity in a large torsion angle.

Further, the second friction material, having a low friction coefficient, exerts a small hysteresis torque characteristic in a working range of fine angle. The first friction material having a high friction coefficient exerts a large hysteresis torque characteristic in a working range of large angle.

Moreover, when a torsion angular velocity is large, the key couples the inner peripheral side flange to the sub plate so that a large hysteresis torque characteristic can be produced even in a fine working angle. When the torsion angular velocity is small, the key is released so that a small hysteresis torque characteristic is produced.

BEST MODE FOR CARRYING OUT THE INVENTION

Figure 1:
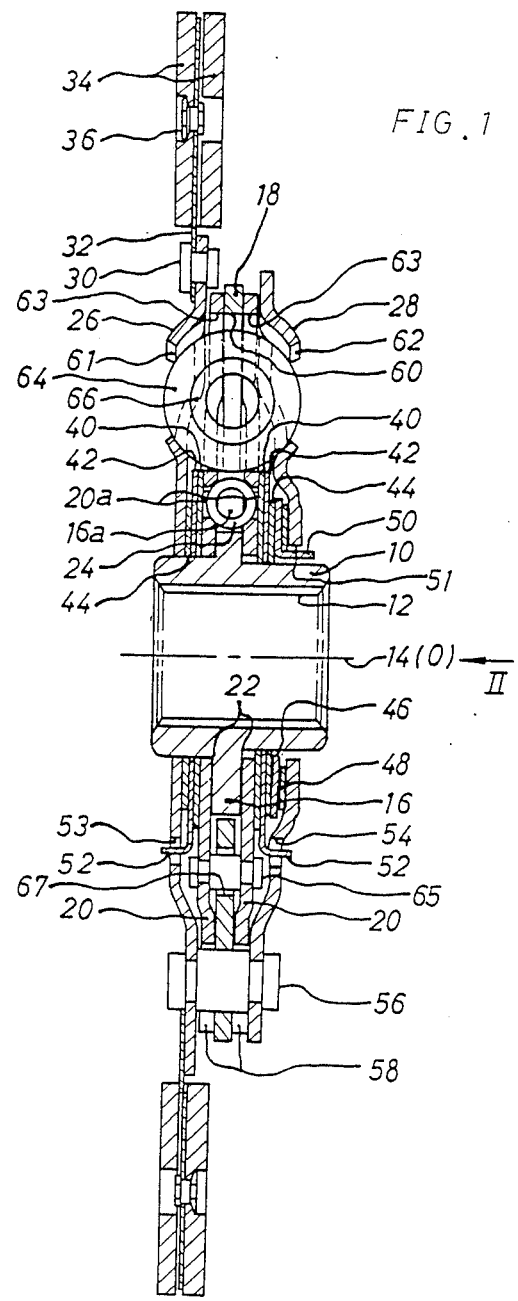
FIG. 1 is a vertical sectional view showing an automobile clutch disc according to the present invention.

In FIG. 1 (sectional view taken on a line I - O - I of FIG. 2) showing a case where the present invention is employed for the automobile clutch for instance, with 10 as a spline hub. A spline internal tooth 12 is formed on an inner peripheral surface of the spline hub 10, and the spline internal tooth 12 is adapted to spline fit onto an output shaft 14 (only its center line being shown) interconnected to a rear stage transmission (not shown).

An inner peripheral side flange 16 extending in a radial outside direction is formed concentrically on an outer peripheral surface of the spline hub 10. An outer peripheral side flange 18 which mates with the inner peripheral side flange 16 with a circumferential clearance 17 (FIG. 2) left therebetween, is installed at a further radial outside direction of the inner peripheral side flange 16.

Two sub plates 20 are installed on opposite sides of the inner peripheral side flange 16 and the outer peripheral side flange 18 through friction washers 22 at their inner peripheral portions in such a manner that they can rotate freely in the circumferential direction in relation to the inner peripheral side flange 16 and the outer peripheral side flange 18. Recessions 16a are formed on an outer periphery of the inner peripheral side flange 16 at opposing positions (two places) spaced 180° apart from each other in the circumferential direction. Further, rectangular holes 20a are made on the sub plates 20 at positions corresponding to the recession 16a, and a coil spring 24 having a weak spring force is compressively installed between the recession 16a and the rectangular holes 20a.

A clutch plate 26 and a retaining plate 28 are disposed at axial outsides of the two sub plates 20 with specified clearances left therebetween, and the clutch plate 26 and the retaining plate 28 fit onto the spline hub 10 in a freely sliding manner in relation to it. A cushioning plate 32 is fastened by rivets 30 to an outer peripheral part of the clutch plate 26, and facings 34 to which an engine power is transmitted are secured by rivets 36 to both faces of the cushioning plate 32. Between the two sub plates 20 and the clutch plate 26 and the retaining plate 28, there interposed friction plates 40 having a high friction coefficient (first friction material), approximately disc-like intermediate plates 42 (intermediate member) and friction plates 44 having a low friction coefficient (second friction material) in this order from the sub plate 20 side, respectively. Further, between the friction plate 44 at a right side of FIG. 1 and the retaining plate 28, there interposed a friction plate 46 and a wave spring 48 so that a spring force of the wave spring 48 is adapted to press the friction plate 40 and the friction plate 44.

Claws 50 (FIG. 2) are formed on an inner peripheral part of the friction plate 46 at four places 90° apart from each other in the circumferential direction, and the claws 50 fit in notches 51 formed on an inner peripheral edge of the retaining plate 28. Moreover, claws 52 are formed on an outer peripheral part of the intermediate plate 42 at four places with equal distances left therebetween in the circumferential direction, and the claws 52 extend in an axial outward direction from holes 53 and 54 of the clutch plate 26 and the retaining plate 28.

Figure 2:
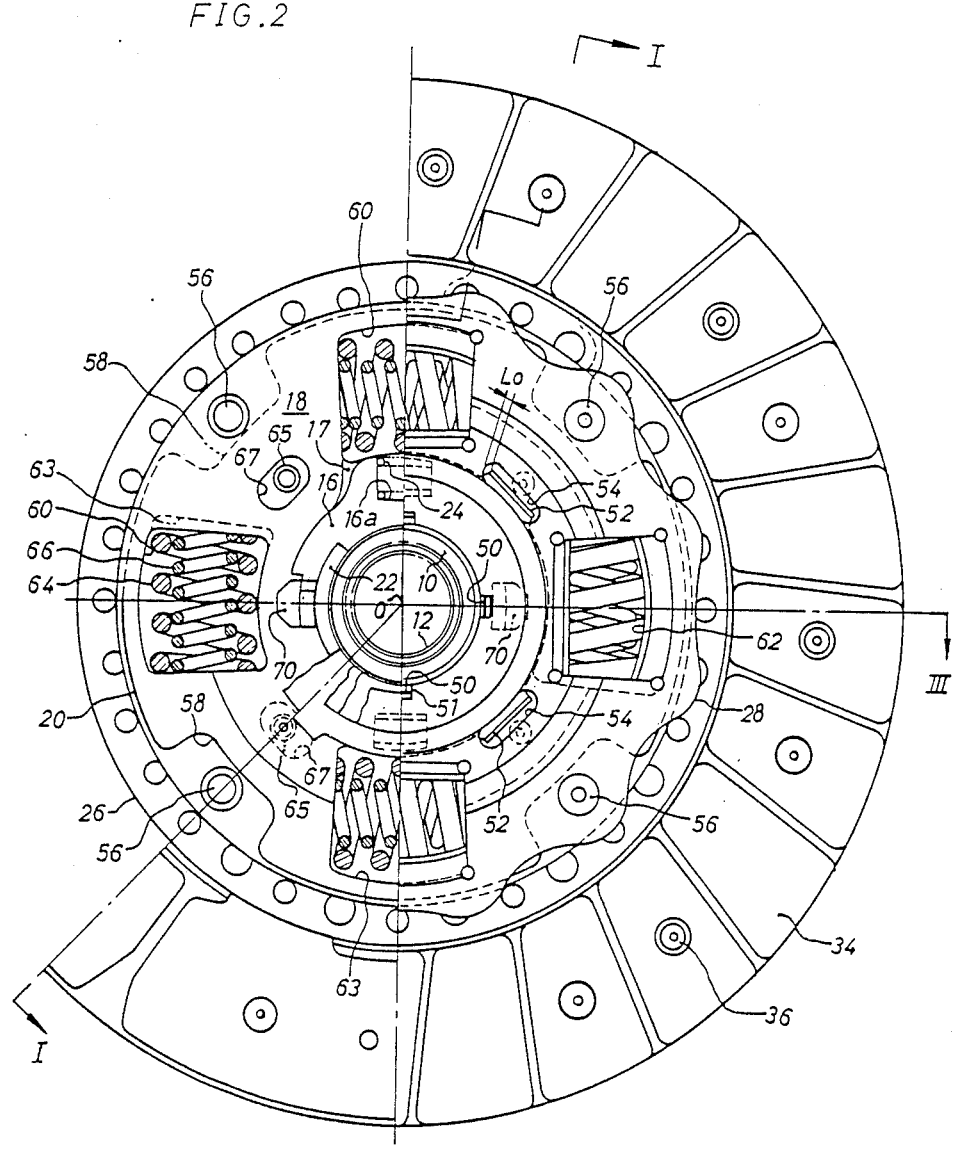
FIG. 2 is a view partly in section, with parts removed, viewed in a direction of arrow II of FIG. 1.

In an initial state of torsion angle zero degree as illustrated by FIG. 2, clearances L0 are left between circumferential end faces of the holes 53 and 54 and circumferential end faces of the claw 52.

The clutch plate 26 and the retaining plate 28 are fastened together in the axial direction by stop pins 56 (FIG. 2) provided on an outer peripheral part at four places 90° apart each other. The stop pin 56 is placed in a notch 58 (FIG. 2) of the sub plate 20, and is freely movable in relation to the spline hub 10 within a range of a circumferential length of the notch 58. Therefore, a low hysteresis torque characteristic is produced by the friction plate 44 within a fine torsion angle range corresponding to the clearance L0 within which the claw 52 of the intermediate plate 42 can move in the circumferential direction, and a high hysteresis torque is produced by the friction plate 44 within a comparatively large torsion angle range after a circumferential end face of the claw 52 strikes against a hole 54. The above-mentioned friction plate 40 through friction plate 44 are disclosed in details in Patent Application No. 60-44300.

Rectangular holes 60 (FIG. 2) are formed on the outer peripheral side flange 18 at four places 90° apart from each other in the circumferential direction. Rectangular holes 63 are made on the sub plate 20 at positions corresponding to the rectangular holes 60, and rectangular holes 61 and 62 are made on the clutch plate 26 and the retaining plate 28 at positions corresponding to the rectangular holes 60. A radially intermediate part of the sub plate 20 is fastened by a sub pin 65 (stud pin), and the sub pin 65 passes through a slotted circular-arc hole 67 of the outer peripheral side flange 18.

Coil springs 64 and 66 having large spring constants are compressively and concentrically installed between the rectangular hole 60 and the rectangular holes 61 and 62, so that the coil springs 64 and 66 exert a large torsional rigidity within a range of large torsion angle and the coil spring 24 exerts a small torsional rigidity within a range of small torsion angle. The above switching process of torsional rigidity by using the coil spring 24 and the coil springs 64 and 66 is disclosed in details in Published Patent Application No. 61-40847.

Figure 3:
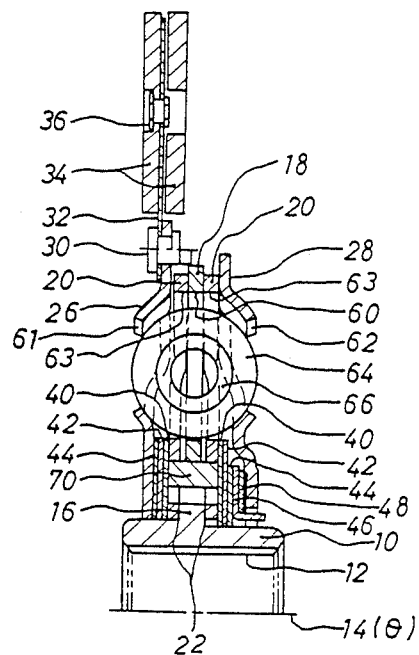
FIG. 3 is a sectional view taken on a line III - O of FIG. 2.

As illustrated in FIG. 3 which is a sectional view taken on a line III - O of FIG. 2, a key 70 pierces the outer peripheral part of the inner peripheral side flange 16, the inner peripheral part of the outer peripheral side flange 18 and the two sub plates 20, and extends in parallel with the center line 0 in the axial direction.

Figure 4:
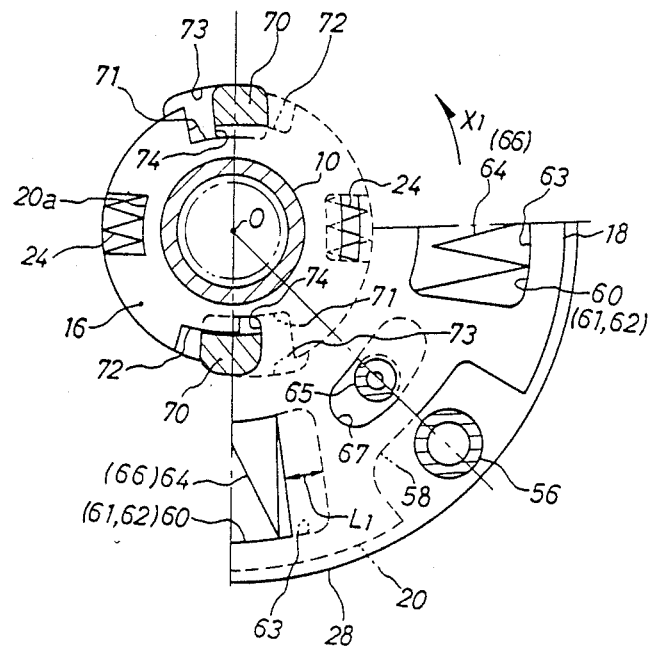
FIG. 4 is an enlarged view of an essential part of the apparatus of FIG. 2.

As shown by FIG. 4, a sectional shape of the key 70 is formed into an approximately rectangular shape, and is installed at two places facing each other across the center 0. On an outer peripheral edge of the inner peripheral side flange 16, a notch 71 permitting the key 70 to fit in is formed extendedly in the circumferential direction. At one circumferential end of the notch 71, a circular-arc stepped part 72 is formed which has a circumferential length sufficient to mate with the key 70 and is shallower than the notch 71. A bottom face of the notch 71 is formed into a curved surface having its center at the center 0, and an inner peripheral side end face of the key 70 is also formed into a corresponding curved surface.

On an inner peripheral edge of the outer peripheral side flange 18 fitting freely rotatingly onto an outer peripheral surface of the inner peripheral side flange 16, a notch 73 recessed toward the outer peripheral side is formed at a position approximately facing on the notch 71, and the notch 73 is formed into a curved surface having its center at the center 0. In FIG. 4 showing a free state, an outer peripheral surface of the key 70 contacts with one circumferential end of the notch 73.

Figure 5:
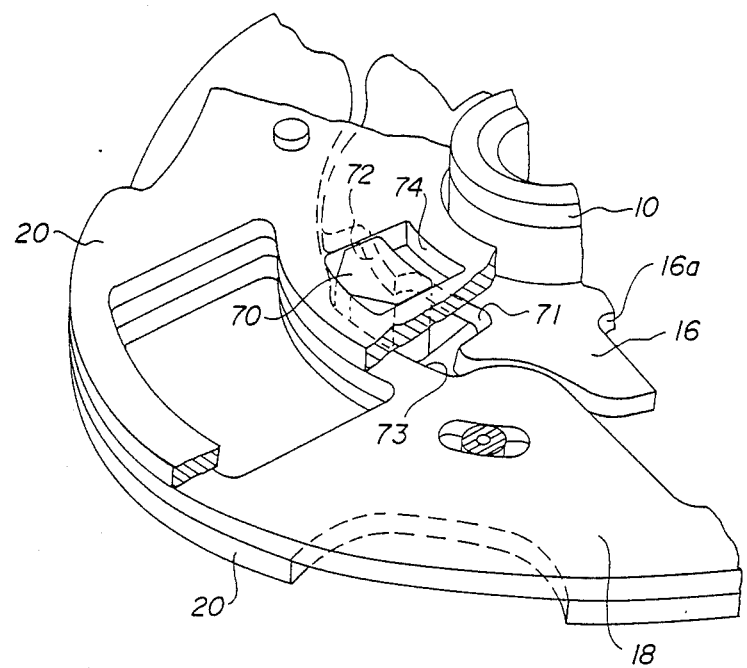
FIG. 5 is a perspective view of an essential part of the apparatus of FIG. 4.

Notches 74 forming a rectangular shape having the same width as the circumferential width of the key 70 are formed on the sub plates 20 which are placed one upon another at right angle to a plane of FIG. 4 in such a manner as sandwiching the inner peripheral side flange 16 and the outer peripheral side flange 18, and the key 70 fits in the notch 74 (FIG. 5). An inner peripheral side end face of the notch 74 is put on an approximately same circumference as the bottom surface of the notch 71, and an outer peripheral side end face of the notch 74 is located at an approximately same circumference with the outer peripheral side end face of the notch 73.

Notches 74 forming a rectangular shape having the same width as the circumferential width of the key 70 are formed on the sub plates 20 which are placed one upon another at right angle to a plane of FIG. 4 in such a manner as sandwiching the inner peripheral side flange 16 and the outer peripheral side flange 18, and the key 70 fits in the notch 74 (FIG. 5). An inner peripheral side end face of the notch 74 is put on an approximately same circumference as the bottom surface of the notch 71, and an outer peripheral side end face of the notch 74 is located at an approximately same circumference as the outer peripheral side end face of the notch 73.

There are two kinds of circumferential lengths among the rectangular holes 61 & 62 of the clutch plate 26 and the retaining plate 28 and the rectangular hole 60 of the outer peripheral side flange 18. In one kind of the length, circumferential end faces of the rectangular holes 60, 61 and 62 coincide with the circumferential end face of the rectangular hole 63 of the sub plate 20 under the free state. Consequently, both ends of the coil springs 64 and 66 press on the rectangular holes 60, 61, 62 and 63.

On the contrary, in the other kind of the length, circumferential lengths of the rectangular holes 60, 61 and 62 are shorter by the clearance L1 than that of the rectangular hole 63 of the sub plate 20 at their both ends, so that the fitting coil springs 64 and 66 press only on the rectangular holes 60, 61 and 62 under the free state.

The operation will be described hereunder. In FIG. 2, when the facing 34 is pressed on an engine side flywheel by a not-shown but well-known pressure plate, a torque is transmitted from the flywheel through the facing 34, the cushioning plate 32, the clutch plate 26, the retaining plate 28, the coil springs 64 and 66, the sub plate 20, the inner peripheral side flange 16 and the spline hub 10 to the output shaft 14 (FIG. 1).

In this instance, when a torsional torque is applied on the facing 34 relatively to the spline hub 10 in a direction of arrow X1 of FIG. 4 for example, the torque is absorbed as described below. The description will be made with reference to FIG. 6 which is a graph showing a relation between a torsion angle $\theta$ and a transmitted torque T, and to FIG. 8 which is a schematic structural diagram of a clutch disc of a preferred embodiment.

(First stage)

Figure 6:
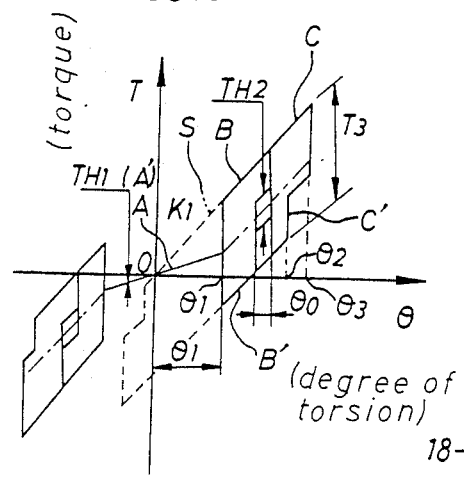
FIG. 6 is a graph showing a related between a torsion angle and a transmitted torque.

In case when the clutch plate 26 and the retaining plate 28 are twisted from the neutral state in the direction of arrow X1 relatively to the inner peripheral side flange 16, a spring constant K2 (FIG. 8) of the coil springs 64 and 66 is set by far larger than a spring constant K1 of the coil spring 24 within a torsion angle $\theta$ of between $0° \sim \theta 1$, so that the coil springs 64 and 66 function as if they are a rigid body to make the clutch plate 26, the retaining plate 28 and the sub plate 20 rotate integrally. Consequently, a torsion is produced between the sub plate 20 and the inner peripheral side flange 16, so that the coil spring 24 is compressed and at the same time a comparatively small hysteresis torque TH1 (FIG. 8) is generated by the friction washer 22 (FIG. 2). Thereby, a torque A of FIG. 6 is obtained.

Figure 7D:
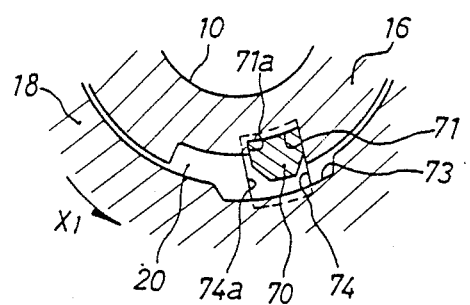
FIG. 7a, FIG. 7b, FIG. 7c and FIG. 7d are enlarged views of essential parts showing working states of a key, respectively.
Figure 7A:
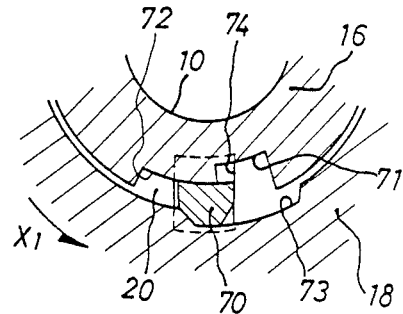

In this instance, the clutch plate 26, the retaining plate 28 and the sub plate 20 integrally rotate from the neutral state shown by FIG. 7a in the direction of arrow X1. Thereby, the key 70 also rotates in the direction of arrow X1 to reach a state of FIG. 7b to cause the torsion angle $\theta$ to reach $\theta 1$ of FIG. 6.

(Second stage)

Figure 7B:
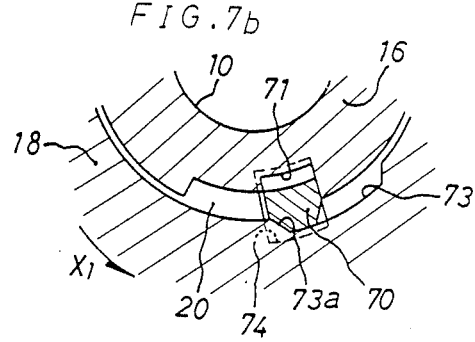

Under the state of FIG. 7b, the key 70 contacts with the circumferential end face of the notch 71, a twisting motion does not proceed any more between the spline hub 10 and the sub plate 20, and they are coupled together by the key 70. Therefore, the sub plates 20 are twisted in relation to the clutch plate 26 and the retaining plate 28 within the torsion angle $\theta$ of $\theta 1 \sim \theta 2$, and the coil springs 64 and 66 provided with no clearance L1 are compressed. And at the same time, a hysteresis torque TH2 (FIG. 8) is generated by the friction plate 44 within an angular range of $\theta 0$ corresponding to the clearance L0 (FIG. 2), thereby a torque B of FIG. 6 is obtained.

Figure 7C:
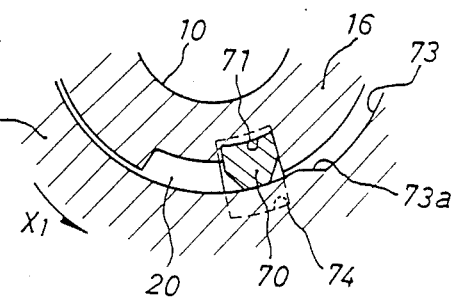
Figure 8:
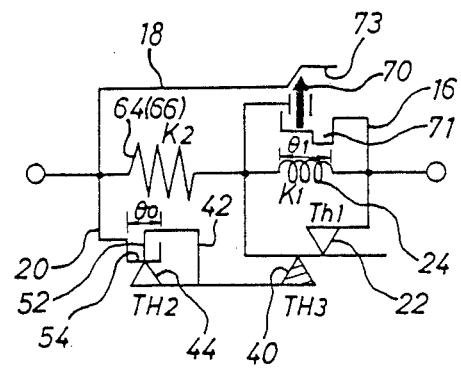
FIG. 8 is a schematic structural diagram of a clutch disc of a preferred embodiment.

Simultaneously, the clutch plate 26 and the retaining plate 28 further rotate in relation to the inner peripheral side flange 16, and a notch 73a formed at a circumferential end of the notch 73 forces the key 70 into the notch 71 to bring about a state of FIG. 7c (FIG. 8). On the other hand, the clutch plate 26 and the retaining plate 28 are twisted in relation to the sub plate 20 coupled by the key 70 to the inner peripheral side flange 16, so that the torsion angle reaches $\theta 2$ when the clearance L1 of FIG. 4 becomes zero.

Because the clearance L0 is provided between the claw 52 of the intermediate plate 42 and the rectangular hole 54 within a range of $\theta 1 \sim \theta 2$, the intermediate plate 42 does not rotate integrally with the clutch plate 26 and the retaining plate 28 so that no hysteresis torque is generated by the friction plate 40.

(Third stage)

All the springs are compressed within a range of $\theta 2 \sim \theta 3$ so that a torque C of FIG. 6 is obtained. When the torsion angle $\theta$ reaches $\theta 3$, the stop pin 56 of FIG. 2 presses on the circumferential end face of the notch 58; the clutch plate 26, the retaining plate 28 and the sub plate 20 are coupled integrally through the stop pin 56; and a torque from the facing 34 (FIG. 2) is transmitted directly to the spline hub 10.

Figure 8A:
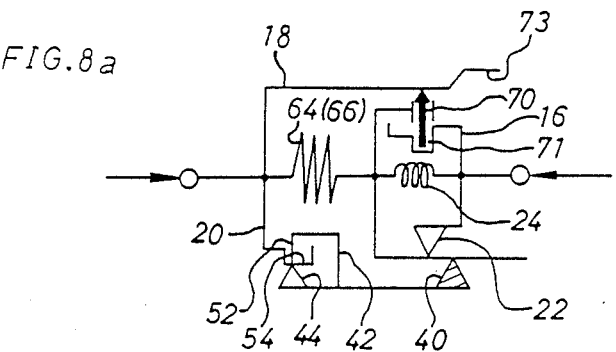
FIG. 8a is a schematic structural diagram showing a case where the disc is twisted at a low torsion angular velocity.

In this range of $\theta 2 \sim \theta 3$, because the claw 52 (FIG. 2) of the intermediate plates 42 press on the rectangular holes 53 and 54 of the clutch plate 26 and the retaining plate 28 as illustrated by FIG. 8a, the friction plates 40 and the sub plates 20 are twisted so that a comparatively large hysteresis torque T3 (FIG. 6) is generated by the friction plates 40.

When returning from the max. torsion angle $\theta 3$ the working process differs depending on a torsion angular velocity as described in the following two cases: (a) In case of slow (small) torsion angular velocity and (b) In case of fast (large) torsion angular velocity.

In case of slow torsion angular velocity, for example, when an engine brake is effected slowly by fully releasing the acceleration pedal during driving a vehicle at a high gear position, the clutch disc works in the reverse order of the above process so that torque characteristics C', B' and A' of FIG. 6 are generated by frictions of the friction plate 40, the intermediate plate 42 and the friction washer 22. The hysteresis torque TH1 obtained by the friction washer 22 is set to an extremely small value within a range of $0° \sim \theta 1$ in FIG. 6, and A and A' are shown by the same straight line.

In this instance, longitudinal expansion forces of the coil springs 64 and 66, FIG. 2, act on the inner peripheral side flange 16, the outer peripheral side flange 18 and the sub plate 20 to return their torsion angles to the neutral state, but the outer peripheral side flange 18 and the sub plate 20 are interconnected through the coil springs 64 and 66 and the clutch plate 26 (FIG. 1) to the facing 34. Accordingly, even when the inner peripheral side flange 16, the outer peripheral side flange 18 and the sub plate 20 are to be returned to the neutral state quickly within a short time by the spring forces of the coil springs 64 and 66, a rotation speed of the facing 34 decelerating nearly synchronously with a vehicle speed decelerates only slowly under the running condition that the engine brake is effected slowly as described above, so that it takes a comparatively long time for the outer peripheral side flange 18 and the sub plate 20 to return to the neutral state.

For this reason, when the notch 74 of the outer peripheral side flange 18 is positioned at an outer periphery of the key 70 fitting in the notch 71 of the inner peripheral side flange 16 at the time when the clutch plate 26 and the retaining plate 28 return from the maximum torsion angle $\theta 3$ in relation to the spline hub 10, a time allowance for the key 70 to slip out of the notch 71 in the radial outward direction is produced due to a centrifugal force acting on the key 70 before the key 70 is held in between the end face 74a of the notch 74 formed on the sub plate 20 and the end face 71a of the notch 71 formed on the inner peripheral side flange 16 by the return action of the outer peripheral side flange 18 in the direction of X1, because return speeds of the inner peripheral side flange 16 and the sub plate 20 are small, so that the key 70 will slip out of the notch 71 toward the outer peripheral side.

Because the coupled state between the inner peripheral side flange 16 and the outer peripheral side flange 18 is released after the key 70 slipped out as described above; the inner peripheral side flange 16, the outer peripheral side flange 18 and the sub plate 20 are returned to the neutral state by the expansion spring forces of the coil springs 64 and 66.

In case of fast torsion angular velocity, for example, when a slight treading/releasing operation of the acceleration pedal (tip-in and tip-out) is done quickly during driving the vehicle at a low gear position, the clutch plate 26 and the retaining plate 28 rotate rapidly in the direction opposite to X1 because the vehicle speed responses susceptibly to the acceleration pedal operation and the engine brake also works well.

In this instance, the return motion of the outer peripheral side flange 18 is not slackened by an inertia of a vehicle body as encountered in the foregoing slow torsion angular velocity. Therefore, even when the notch 73 is positioned at the outer peripheral side of the key 70, the key 70 is rapidly held in between circumferential end faces of the notch 71 and the notch 74 before the key 70 slips out of the notch 71 due to the centrifugal force, so that the coupled state by the key 70 is prevented from being released.

Figure 8B:
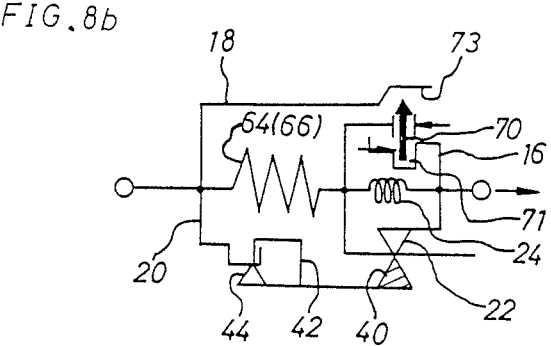
FIG. 8b is a schematic structural diagram showing a case where the disc is twisted at a high torsion angular velocity.

Namely, repulsion forces which are produced by the coil spring 24 in compressed state and the coil springs 64 and 66, instantaneously expanded once and then compressed again, act on the end face 71a at the circular arc stepped part 72 side of the notch 71 and the end face 74a at the circular-arc stepped part 72 side of the notch 74 to cause them to get near each other. The key 70 is held by these forces (FIG. 8b).

The holding force of the end faces 71a and 74a (holding parts) overcomes the centrifugal force to maintain the coupled state provided by the key 70. While the key 70 fits in the notch 71 and the notch 74, the inner peripheral side flange 16 is in the integrally coupled state with the sub plate 20 so that the first stage process accompanied by the expansion of the coil spring 24 does not occur.

Consequently, in this case, the disc presents a torque characteristic having no low hysteresis region (first stage) which is represented by a broken line S of FIG. 6.

When twisted from free state in the direction opposite to X1, because the circular-arc stepped part 72 is formed on the notch 71 at only one end side opposite to X1, the disc presents a minus side characteristic, i.e. and ordinary characteristic of FIG. 6. Therefore, the first stage low hysteresis torque section does not disappear.

Namely, the small torsional rigidity is exerted by the weak torsion spring 24 of the inner peripheral side flange 16 for a small torque angle, and the large torsional rigidity is exerted by the strong torsion springs 64 and 66 of the outer peripheral side flange 18 for a large torsion angle, so that the idle rattle and the running rattle can be avoided.

The small hysteresis torque characteristic can be generated by the friction plate 44 having the low friction coefficient within the working range of fine angle, and the large hysteresis torque characteristic can be generated by the friction plate 40 having the high friction coefficient within the working range of large angle.

Further, in case of the high torsion angular velocity, the inner peripheral side flange 16 is coupled to the sub plate 20 by the key 70 so that the large hysteresis torque characteristic can be generated even in a fine working angle. Therefore, a rocking vibration of vehicle body due to the low frequency abnormal vibration at the time of tip-in and tip-out can be avoided.

On the other hand, in case of the low torsion angular velocity, the coupled state of the key 70 is released so that the small hysteresis torque characteristic can be generated.

Another mode for Carrying Out the Invention (1) This invention is not limited to the foregoing embodiment only. For instance, the key 70 is not limited to the above case of being urged toward the radial outside by the centrifugal force produced by the rotation of disc, but may be urged by a spring force of a coil spring etc.

(2) This invention is not limited to be applied to the clutch disc for automobile use, but may be applied to a damper disc not having the facing 34 at its outer peripheral part.

Industrial Useful Field

The damper disc according to the present invention is especially useful for the automobile clutch disc.

What is claimed is:

1. A damper disc, in which a hub flange of a spline hub is divided into an inner peripheral side flange having a hub and an outer peripheral side flange which are meshed with each other with a circumferential clearance therebetween, annular sub plates holding both said flanges are installed on opposite sides of both said flanges, a relatively weak torsion spring interposed in a recession and a rectangular hole at a position where said sub plates face on said inner peripheral side flange, inner peripheral parts of said sub plates are pressed on opposite side faces of said inner peripheral side flange, a retaining plate and a clutch plate are provided on outside faces of both said sub plates opposite to a flange through a first friction material having a relatively high friction coefficient, an intermediate member and a second friction material having a relatively low friction coefficient, said retaining plate and said clutch plate being coupled by a stop pin at an outer peripheral part so as to compress both said friction materials, said intermediate member having claws fitted in holes in said retaining plate and said clutch plate in such manner that said claws can move freely in a circumferential direction within a specified torsion angle, relatively strong torsion springs compressively installed in rectangular holes in said retaining plate, said clutch plate and said outer peripheral side flange at a position where said retaining plate and said clutch plate face the outer peripheral side flange, a key piercing said outer peripheral side flange, said inner peripheral side flange and both said sub plates in an approximately center line direction of said damper disc and positioned so as to be urged toward an outer periphery of said damper disc, notches on the inner peripheral side flange and said sub plate for holding said key freely slidingly in a radial direction of the disc, and a force for holding said key at circumferential end faces of said both notches for setting and holding said key between both said end faces for relatively high torsion angular velocity of said damper disc and for releasing said key from said end faces for relatively low torsion angular velocity of said damper disc.

2. A damper disc as set forth in claim 1, in which a stepped part extending to a specified length in a circumferential direction of said damper disc is consecutively formed on said notch formed on the inner peripheral side flange for permitting said key to pass therethrough, and a cam surface for moving said key from said stepped part into said notch when a torsion angle of said damper disc becomes relatively large, said cam surface being formed on an inner peripheral surface of said outer peripheral side flange facing on an outer peripheral surface of said key.

* * * * *